United States Patent
Rogers

[11] Patent Number: 6,151,873
[45] Date of Patent: Nov. 28, 2000

[54] LEGGING FOR A HORSE

[76] Inventor: Sharon L. Rogers, 28980 Vallejo Ave., Temecula, Calif. 92592

[21] Appl. No.: 09/111,602

[22] Filed: Jul. 7, 1998

Related U.S. Application Data

[60] Provisional application No. 60/051,893, Jul. 8, 1997.

[51] Int. Cl.[7] .................................................. B68C 5/00
[52] U.S. Cl. ........................................................ 54/82
[58] Field of Search ............................ 54/82; 119/850; 168/18

[56] References Cited

U.S. PATENT DOCUMENTS

| | | | |
|---|---|---|---|
| 903,149 | 11/1908 | Bowlds | 54/82 |
| 4,342,185 | 8/1982 | Pellew | 54/82 |
| 5,152,285 | 10/1992 | Gnegy | 54/82 X |
| 5,361,564 | 11/1994 | Hickman | 54/82 X |
| 5,676,094 | 10/1997 | Gun-Munro | 119/850 |

*Primary Examiner*—Robert P. Swiatek
*Attorney, Agent, or Firm*—Timothy Thut Tyson; Ted Masters; Freilich, Hornbaker & Rosen

[57] ABSTRACT

A legging (20) for a horse includes a flexible rim (30) to which is attached a fly netting (40). Three resilient polyurethane foam columns (42, 44, 46) are vertically disposed between the top (36) and bottom (38) of the rim to provide vertical rigidity. The legging is wrapped around the lower leg (700) of the horse and is secured in place with hook and loop fasteners (52, 54, 56, 58, 60, 62). The rim and columns space the netting from the leg so that horse flies cannot bite the leg and also allow improved air circulation.

9 Claims, 2 Drawing Sheets

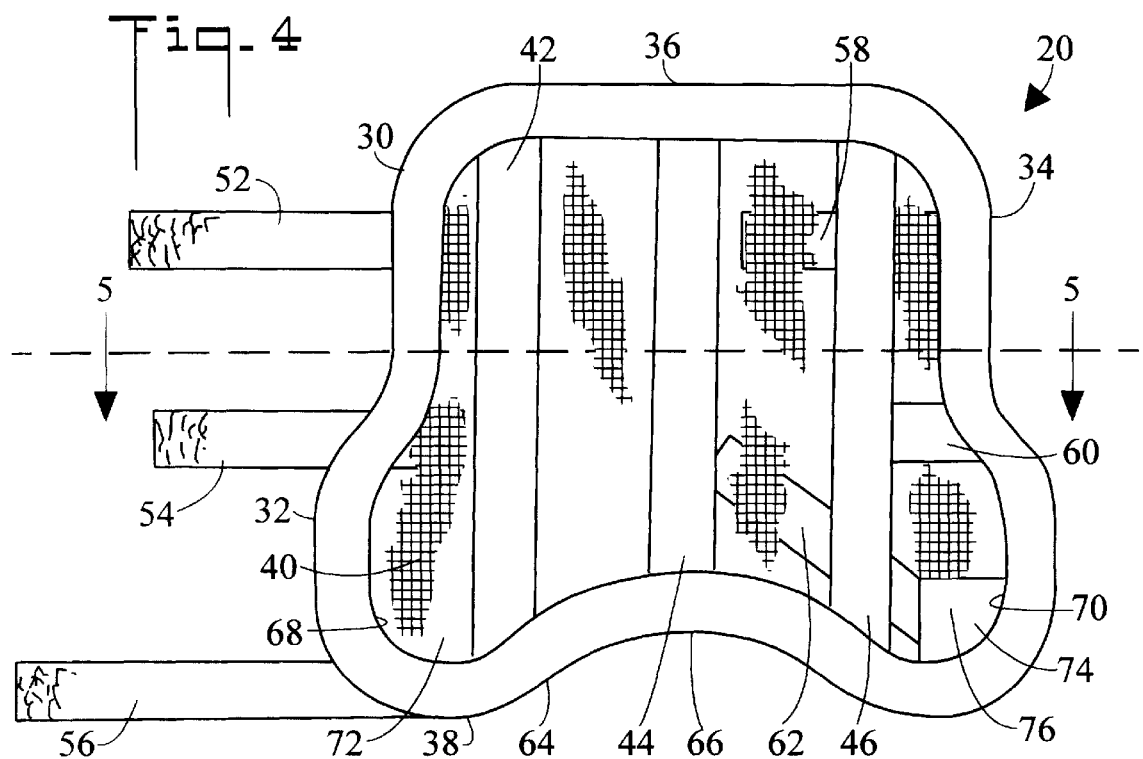
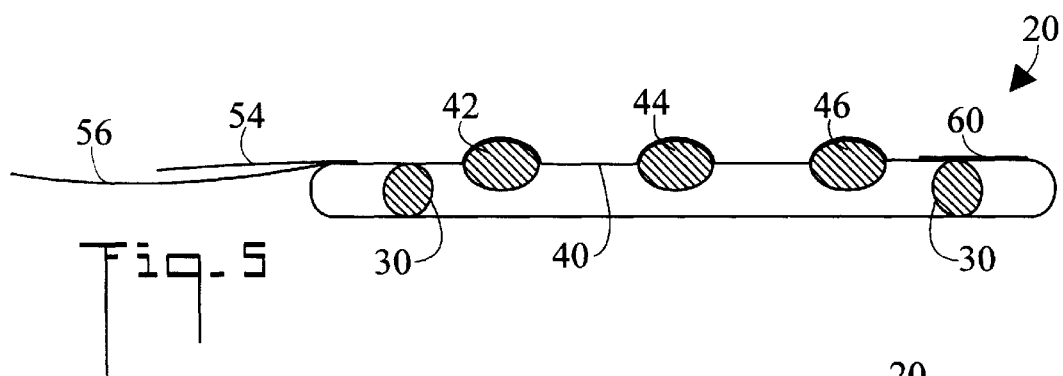
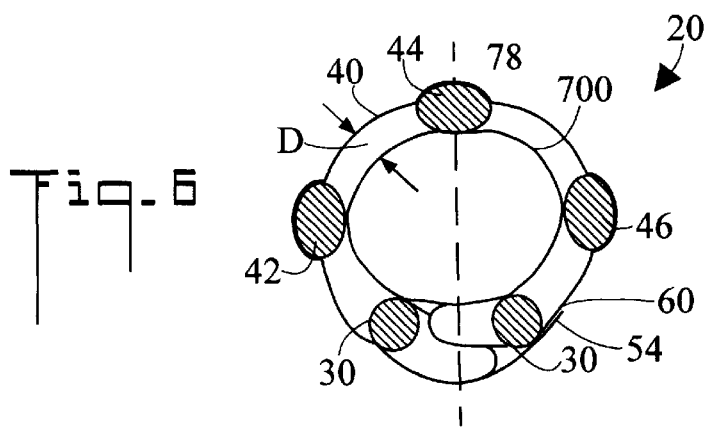

LEGGING FOR A HORSE

CROSS REFERENCE TO RELATED APPLICATION

This application claims the benefits under 35 U.S.C. §119(e) of U.S. Provisional Application No. 60/051,893, filed Jul. 8, 1997.

TECHNICAL FIELD

The present invention pertains to tack and related equipment for horses, and in particular to a legging for the lower legs of a horse for providing protection from horse flies and other troublesome insects.

BACKGROUND ART

Leggings for horses are well known in the art. These devices fall into two general categories: 1. leggings which are specifically designed to both strengthen and protect the lower legs of the horse from injury, and 2. garments which protect the lower legs from horse flies. For example, U.S. Pat. No. 2,246,100 illustrates an elastic horse sock for jumping and race horses. The purpose of the invention is to strengthen and brace the fetlock joint and tendons of a horse to prevent it from being injured and breaking down. The horse sock comprises a band of elastic webbing capable of being stretched longitudinally and laterally allowing the sock to stretch and conform to the leg. The upper and lower portions of the sock gradually diminish in diameter causing the sock to firmly grip the leg. A zipper is used to close the sock once it is put on the horse. U.S. Pat. No. 4,099,269 shows a protective device that can be used for protecting the fetlock of a horse. The invention has a plurality of juxtaposed layers of resilient and shock absorbent bubble pack material located within an outer covering. The bubble pack material cushions blows or forces applied to the protected areas. In one embodiment, hooked and looped fastening material, such as sold under the trademark VELCRO, is used to hold the device around the horse's leg. U.S. Pat. No. 4,342,185 discloses a protective garment for the leg of a horse having a flat flexible pad which folds to encircle the leg and is secured in position by hook and loop fasteners with straps on one side edge of the pad cooperating with strips on the other side edge. The pad consists of an outer layer of nylon reinforced PVC, a central layer of foam, and an inner layer of imitation fur. U.S. Pat. No. 5,361,564 shows a net having an elongated rectangular panel of fiberglass netting which wraps around the front leg of a horse to prevent flies and other insects from alighting. The net is secured to the leg just above the knee by the use of a hook and loop fastener with the remainder hanging down to a point just above the hoof. The net can be installed and removed easily and quickly, and, once in position, does not inhibit the movement of the horse.

FIGS. 1 and 2 show another prior art fly netting 500 which is commercially available for the lower leg 600 of a horse. FIG. 1 is an outside open plan view and FIG. 2 is a side elevation view. Fly netting 500 has a rectangular piece of plastic netting 502 surrounded by a border 504 of polar or felt fleece. Three straps 506, 508, and 510 and three strips 512, 514, and 516 of cooperating hook and loop fastener material are used to wrap and secure the fly netting around the leg. Because of its flaccid construction, fly netting 500 tends to droop, buckle, and cling to the leg of the horse when heated by the sun and the body heat of the horse. The fly netting 500 then allows insects access to the leg and may bind and catch on the fetlock and coronet areas of the leg thereby irritating the horse.

DISCLOSURE OF INVENTION

The present invention is directed to an improved legging for a horse. Vertical columns in the legging make it self supporting so that it will not droop or otherwise collapse vertically. The vertical columns and a rim hold the fly netting away from the lower leg making it impossible for a fly to bit the leg through the net and also improve air circulation keeping the legging and leg cool. The legging is fabricated from a soft resilient material thereby protecting the leg from kicks and impacts when the horse is rolling, playing, and being transported and cushioning the leg when the horse is lying down. The legging is adapted for both the front and rear legs, and comes in different sizes to accommodate different size animals. The legging is particularly useful on horses that are allergic to fly spray and foals where the use of chemicals is undesirable.

In accordance with an important aspect of the invention, the rim and columns are fabricated from a resilient material such a flexible polyurethane foam with a fabric covering.

In accordance with a preferred embodiment of the invention, the planar netting is surrounded by the rim. At least one vertical column is disposed between the top and bottom of the rim to provide structural rigidity.

In accordance with an important aspect of the invention, the legging has left and right sides which may be selectively connected so that the legging assumes a substantially tubular shape around the leg of the horse. In a preferred embodiment, the connection is effected using cooperating hook and loop fasteners.

In accordance with another important feature of the invention, the bottom of the rim has an upward concave portion to provide a cutout for receiving the digital extensor tendon of the horse.

In accordance with an important aspect of the invention, the weight of the legging is balanced between the left and right sides of the legging when the legging is wrapped around a horse in order to minimize the tendency of the legging to rotate around the leg during use. In accordance with an important feature of the invention, three vertical columns including left middle, and right columns are provided between the top and bottom of the rim. The middle column is coupled to the bottom at the apex of the concave portion. One of the left and right columns is made heavier by making it larger in order to balance the weight between the left and right sides of the legging.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 4 is an inside open plan view of the legging;

FIG. 5 is a cross sectional view of the legging along the line 5—5 of FIG. 4; and, FIG. 6 is a cross sectional view of the legging along the line 6—6 of FIG. 3.

MODES FOR CARRYING OUT THE INVENTION

Figure 1:
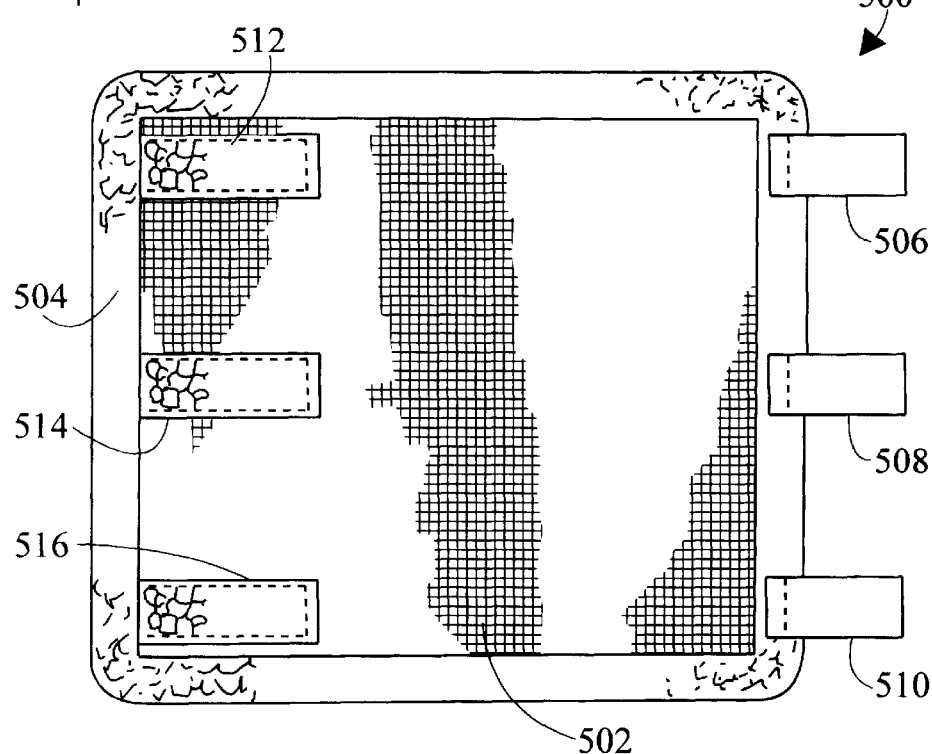
FIG. 1 is an outside open plan view of a prior art fly netting for mounting on the leg of a horse.
Figure 2:
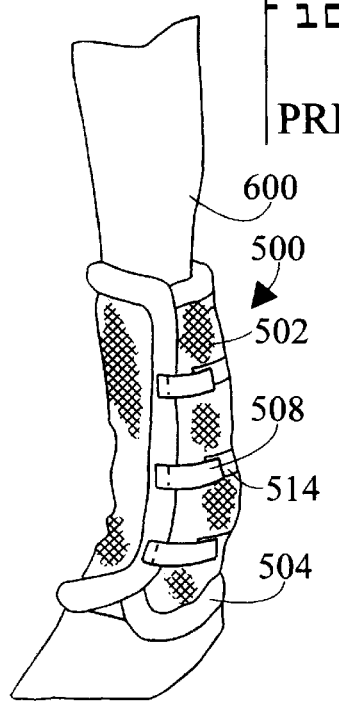
FIG. 2 is a side elevation view of the prior art fly netting mounted on the left front leg of a horse.
Figure 3:
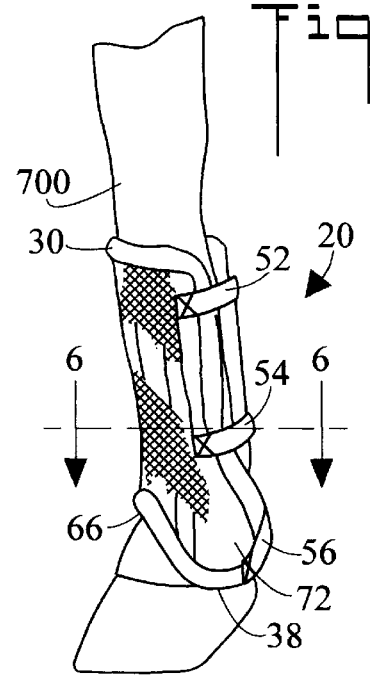
FIG. 3 is a side elevation view of a legging for a horse in accordance with the present invention mounted on the left front leg of a horse.

Referring initially to FIG. 3, a side elevation view of a legging for a horse in accordance with the present invention, generally designated as 20, is mounted on the left front leg 700 of a horse. FIG. 4 is an inside open plan view of the legging 20. It is noted that while legging 20 is specifically designed for horses, it can also be readily applied to other members of the equine species, and even to other similar species of animals. Surrounding the substantially trapezoidal shaped of the legging is a rim 30 having a left side 32, right side 34, top 36, and bottom 38. A flat screen fly netting 40 is attached to and covers the entire aperture of the rim. At least one column 44 is connected between the top 36 and bottom 38 spaced from the left and right sides 32 and 34. Column 44 in cooperation with left and right sides 32 and 34 provide vertical rigidity to legging 20 preventing it from drooping or otherwise collapsing vertically. In a preferred embodiment, a left column 42 and a right column 46 are added to the legging 20 equally spaced from middle column 44 on either side thereby further enhancing the vertical rigidity provided by middle column 44 and left and right sides 32 and 34. Rim 30 and columns 42, 44, and 46 are fabricated from a resilient material such as pliable polyurethane foam covered by fabric which retains its shape yet is soft so that it cannot injure the horse. In a preferred embodiment, the covering of rim 30 is made of a fabric sold under the trademark CORDORA which is both strong and resists unraveling if abraded, and the coverings of columns 42, 44, and 46 are made of another fabric sold under the trademark FLIGHT SATIN which is smooth so as not to rub hair off the leg 700.

Means are provided for selectively connecting the left and right sides 32 and 34 so that legging 20 assumes the substantially tubular shape depicted in FIG. 3. In the embodiment shown, cooperating hook and loop fasteners, such as sold under the trademark VELCRO, are used to hold the left and right sides together. However, it will be appreciated that other fastening means such as laces, zippers, buttons, or the like could also be employed. Three straps 52, 54, and 56 having the loops of the hook and loop fastener are attached to the left side of the legging. Three cooperating strips 58, 60, and 62 having the hooks of the hook and loop fastener are attached to the right side 34. It will be appreciated that the location of the hooks and loops of the hook and loop fastener can be reversed from right to left to effect the same result.

The bottom 38 has an upward concave portion 64 culminating in an apex 66 substantially in the center of the concave portion and equally spaced from the left and right sides 32 and 34. This shape provides relief for the front facing digital extensor tendon of the horse allowing it to move freely. As the horse walks or runs, the extensor tendon flexes. If legging 20 were to contact the tendon, it would have a tendency to be rotated, elevated, or otherwise displaced.

The concave portion also better conforms the bottom of the legging to the horse's hoof providing some resistance to the tendency of the legging to rotate on the leg. Gravity causes the legging to ride on the top of the hoof at the apex of the concave portion. In order to rotate, the legging must rise up along one side of the concave portion counter to gravity which is difficult. Even if it does ride up, the next step will tend to cause the legging to slide down along the concave portion until the apex is again riding on the top of the hoof thereby reorienting the legging properly on the leg.

Bulges 68 and 70 in the right and left sides 32 and 34 create pockets 72 and 74 for the sesamoid bone which also inhibit the tendency of the legging to rotate. In order to rotate, the left and right sides 32 and 34 of the rim 30 must pass over the sesamoid bones which is difficult. A small pad 76 is placed near the lower right corner of legging 20 to protect the sesamoid bone located at the rear of the lower leg just above the hoof when the legging 20 is wrapped around the leg.

The hook and look fasteners are positioned to maximize the holding of the legging in the best position on the horse. The upper hook and loop fastener consists of the strap 52 and strip 58 and is positioned adjacent the top 36. The middle hook and loop fastener consists of the strap 54 and strip 60 and is positioned above the bulges 68 and 70. Lower hook and loop fastener consists of the strap 56 and strip 62 and is positioned adjacent bottom 38. In a preferred embodiment, lower strip 62 is oriented at an upward angle on the netting 40 from bottom 38 and lower strap 56 is attached to the rim 30. When legging 20 is wrapped around the front leg 700 of the horse as shown in FIG. 3, strap 56 is bent at an angle placing it underneath the sesamoid bone where it engages strip 62 putting the sesamoid bone securely in pockets 72 and 74. This disposition ensures that legging 20 will not ride up the leg 700 of the horse and will not rotate.

FIG. 5 is a cross sectional view of legging 20 along line 5—5 of FIG. 4. Rim 30 and columns 42, 44, and 46 are constructed of polyurethane foam covered with fabric and are substantially round or oblong having a thickness sufficient to hold the netting 40 off the horse's leg.

FIG. 6 is a cross sectional view of legging 20 along line 6—6 of FIG. 3. When legging 20 is wrapped around the lower leg 700 of the horse, the netting 40 is spaced a predetermined distance D from the inside of the legging and from the horse by the thickness of rim 30 and columns 42, 44, and 46. This arrangement prevents a horse fly from biting the thin skin of the lower leg 700 through the netting. If netting 40 were not spaced from leg 700, a horse fly could still bite through the holes in the netting 40. Additionally, the spacing of netting 40 increases air circulation, thereby keeping legging 20 and the leg cooler and dryer. In a preferred embodiment, rim 30 and columns 42, 44, and 46 are selected to be of a thickness to provide a one-half to one inch spacing D from the horse's leg. Columns 42, 44, and 46 and rim 30 are spaced near enough to each other to keep netting 40 away from the leg and yet not so close as to impede the air circulation.

In order to maintain the usefulness of the concave portion 64 and the pad 76, the legging 20 should not rotate on the leg 700. Inhibition of rotation is achieved in three ways: 1. by the concave portion 64 riding on the top of the hoof discussed above, 2. by the bulges 68 and 70 surrounding the sesamoid bones, discussed above, and 3. by balancing the weight of each half of the legging on each side of a centerline 78. The centerline passes through the middle column 44 that is in turn attached to the apex 66 of the concave portion shown in FIG. 4. The weight of the legging is balanced between the left half and right half by making left column 42 slightly larger to therefore weigh slightly more than right column 46. Approximately one-tenth of an ounce increase in weight is usually sufficient to achieve the desired balance. The additional weight of left column 42 offsets the weight of straps 52, 54, and 56 and strips 58, 60, and 62 which are primarily on the right half when legging 20 is in the wrapped or tubular configuration shown in FIG. 6.

A legging for the right front leg is preferably a mirror image of the one for the left leg shown in FIGS. 3–6. The fastening straps 52, 54, and 56 of the right legging are then positioned on the outside of the leg as are the ones on the left legging. The positioning of the fastening straps toward the outside of the horse facilitates the installation and removal of the leggings from the horse. The leggings for the rear legs are similar to the ones for the front legs but are longer.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A legging for a horse, comprising:

a rim having a top, a bottom, a left side, and a right side;

netting attached to said rim;

three spaced apart columns connected between said top and bottom, said three columns including a left column, a middle column, and a right column; and, said bottom having an upward concave portion having an apex.

2. A legging according to claim 1, wherein said apex is substantially equidistant from said left and right sides.

3. A legging according to claim 2, wherein said middle column is coupled to said upward concave portion at said apex, said left and right columns and said left and right sides are equally spaced from said middle column, and one of said left and right columns weighs more than the other.

4. A legging for a horse, comprising:

a rim having a top, a bottom, a left side, and a right side;

netting attached to said rim;

at least one column connected between said top and bottom and spaced from said left and right sides;

means for selectively connecting said left and right sides together so that said legging assumes a substantially tubular shape;

wherein said connecting means includes at least one hook and loop fastener;

wherein at least one of said left and right sides has a bulge adjacent said bottom creating a pocket for the sesamoid bone of the horse; and, wherein said strip of said lower hook and loop fastener is oriented at an upward angle from said bottom.

5. A legging for a horse, comprising:

a rim having a top, a bottom, a left side, and a right side;

netting attached to said rim;

three spaced apart columns connected between said top and bottom, said three columns including a left column, a middle column, and a right column;

means for selectively connecting said left and right sides together so that said legging assumes a substantially tubular shape; and, wherein said rim and said three columns are able to space said netting a predetermined distance D from the leg.

6. A legging according to claim 5, wherein said at least one column includes a left column, middle column, and right column spaced from each other and connected between said top and bottom.

7. A legging according to claim 6, wherein said predetermined distance is substantially one-half to one inch.

8. A legging according to claim 6, wherein:

said bottom has an upward concave portion having an apex substantially equidistant from said left and right sides;

said middle column is coupled to said upward concave portion at said apex;

said left and right columns and said left and right sides are equally spaced from said middle column; and, one of said left and right columns weighs more than the other thereby balancing the weight of the left half of said legging to the weight of the right half of said legging.

9. A legging for the leg of a horse, comprising:

a rim having a top, a bottom, a left side, and a right side;

netting attached to said rim;

at least one column connected between said top and bottom and spaced from said left and right sides; and, said at least one column and said rim having a thickness to hold said netting off the leg of the horse.

* * * * *